(12) United States Patent
Tantrum

(10) Patent No.: US 8,150,853 B2
(45) Date of Patent: Apr. 3, 2012

(54) EFFICIENT METHOD FOR CLUSTERING NODES

(75) Inventor: Jeremy Tantrum, Shoreline, WA (US)

(73) Assignee: Microsoft Corporation, Redmond, WA (US)

(*) Notice: Subject to any disclaimer, the term of this patent is extended or adjusted under 35 U.S.C. 154(b) by 44 days.

(21) Appl. No.: 12/853,435

(22) Filed: Aug. 10, 2010

(65) Prior Publication Data

US 2010/0325110 A1    Dec. 23, 2010

Related U.S. Application Data

(62) Division of application No. 12/036,720, filed on Feb. 25, 2008, now Pat. No. 7,818,322.

(51) Int. Cl.
*G06F 17/30* (2006.01)

(52) U.S. Cl. ........................................ 707/737; 707/804

(58) Field of Classification Search .................. 707/737, 707/804, 808, 790, 791, 797; 709/225
See application file for complete search history.

(56) References Cited

U.S. PATENT DOCUMENTS

| | | | |
|---|---|---|---|
| 5,596,703 A | 1/1997 | Eick | |
| 6,360,227 B1 | 3/2002 | Aggarwal | |
| 6,801,200 B1 | 10/2004 | Prakriya | |
| 6,909,965 B1* | 6/2005 | Beesley et al. | 701/209 |
| 7,461,073 B2* | 12/2008 | Gao et al. | 1/1 |
| 2005/0198286 A1* | 9/2005 | Xu et al. | 709/225 |
| 2005/0222972 A1 | 10/2005 | Mishra | |
| 2006/0047655 A1 | 3/2006 | Peter | |
| 2006/0290697 A1 | 12/2006 | Madden | |
| 2007/0174275 A1* | 7/2007 | Kan et al. | 707/5 |
| 2007/0179944 A1* | 8/2007 | Van Dyke Parunak et al. | 707/5 |
| 2007/0192350 A1 | 8/2007 | Gao | |
| 2009/0216780 A1 | 8/2009 | Tantrum | |

OTHER PUBLICATIONS

Koga, Hisashi, Fast Agglomerative Hierarchial Clustering Algorithm Using Locality-Sensitive Hashing, http://www.springerlink.com/content/0pq7g23467136305/fulltext.pdf, Jul. 21, 2006.

Mori, Junichiro, Extracting Relations in Social Networks from the Web Using Similarity Between Collective Contexts, http://iswc2006.semanticweb.org/items/Mori2006eu.pdf, Nov. 2006.

Stuetzle, Werner, A Generalized Single Linkage Method for Estimating the Cluster Tree of a Density, http://www.stat.washington.edu/wxs/Learning-papers/gsl-techreport-4-24-07.pdf, Feb. 27, 2007.

Notice of Allowance mailed Jun. 8, 2010 in U.S. Appl. No. 12/036,720.

* cited by examiner

*Primary Examiner* — Hung T Vy
(74) *Attorney, Agent, or Firm* — Shook Hardy & Bacon LLP

(57) ABSTRACT

Methods and computer storage media for clustering nodes are provided. An input file is received that is comprised of primary nodes, secondary nodes and metrics that relate to the association between the primary nodes and the secondary nodes. Upon receiving the input file, the input file is abridged to reduce the number of nodes contained in the input file. The unique initial primary nodes are then clustered with their associated secondary node. The clusters containing the unique initial primary nodes are replaced if a subsequent related cluster satisfies a pre-defined condition. In some embodiments, multiple clusters are then merged until the cluster size reaches a pre-defined size. In some embodiments, the input file is cleaned and sorted prior to being abridged.

19 Claims, 8 Drawing Sheets

FIG. 3A.

INPUT FILE

| PRIMARY NODE | SECONDARY NODE | METRIC |
|---|---|---|
| N15 | A | 1 |
| N21 | B | 17 |
| N31 | B | 7 |
| N12 | E | 13 |
| N14 | B | 4 |
| N22 | C | 8 |
| N23 | D | 5 |
| N13 | A | 12 |
| N11 | F | 24 |

FIG. 3B.

SORTED FILE

| PRIMARY NODE | SECONDARY NODE | METRIC |
|---|---|---|
| N11 | F | 24 |
| N12 | E | 13 |
| N13 | A | 12 |
| N14 | B | 4 |
| N15 | A | 1 |
| N21 | B | 17 |
| N22 | C | 8 |
| N23 | D | 5 |
| N31 | B | 7 |

FIG. 3C.

ABRIDGED FILE

| PRIMARY NODE | SECONDARY NODE | METRIC |
|---|---|---|
| N11 | F | 24 |
| N12 | E | 13 |
| N13 | A | 12 |
| N21 | B | 17 |
| N22 | C | 8 |
| N23 | D | 5 |
| N31 | B | 7 |

US 8,150,853 B2

EFFICIENT METHOD FOR CLUSTERING NODES

This application is a Divisional Application that claims the benefit of U.S. patent application Ser. No. 12/036,720, filed Feb. 25, 2008, entitled "EFFICIENT METHOD FOR CLUSTERING NODES."

BACKGROUND

Traditionally, when a large number of nodes exist it is difficult to analyze the nodes in order to determine if a relationship among the nodes exists. The relationships between nodes are often indicative of an underlying clustering of the nodes. Clustering of the nodes has traditionally been an inefficient process that requires the distance between all pairs of nodes to be considered before a relationship between the various nodes can be realized.

SUMMARY

Embodiments of the present invention relate to methods and computer storage media for clustering nodes. An input file is received that is comprised of primary nodes, secondary nodes and metrics that relate to the association between the primary nodes and the secondary nodes. Upon receiving the input file, the input file is abridged to reduce the number of nodes contained in the input file. The unique initial primary nodes are then clustered with their associated secondary node. The clusters containing the unique initial primary nodes are replaced if a subsequent related cluster satisfies a pre-defined condition. Clusters are then merged until the cluster size reaches a pre-defined size.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWING

Embodiments are described in detail below with reference to the attached drawing figures, wherein:

FIG. 3A is a block diagram of an exemplary input file, in accordance with an embodiment of the present invention;

FIG. 3B is a block diagram of an exemplary sorted input file, in accordance with an embodiment of the present invention;

FIG. 3C is a block diagram of an exemplary abridged input file, in accordance with an embodiment of the present invention;

DETAILED DESCRIPTION OF THE INVENTION

Figure 1:
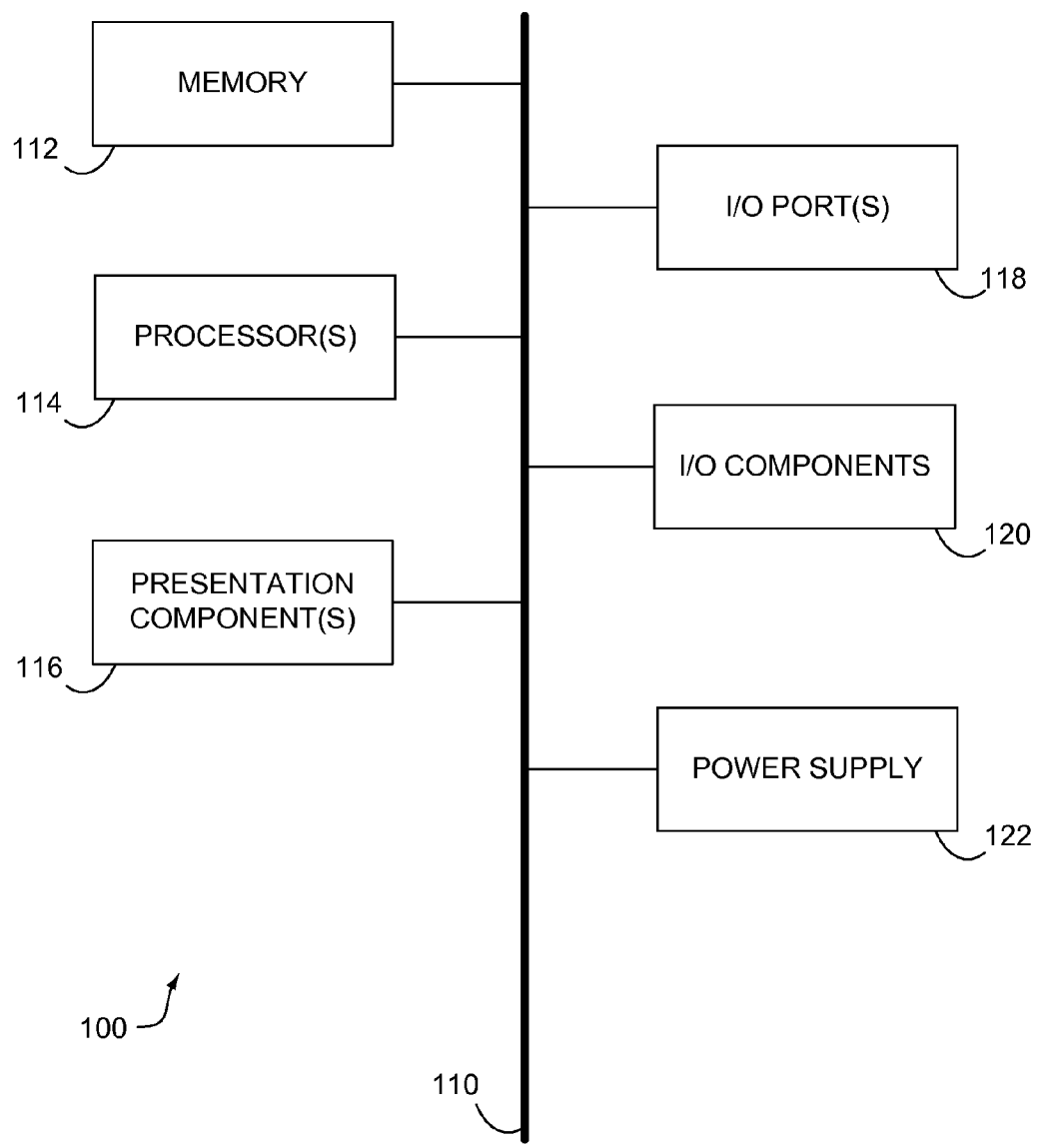
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

An input file is received that is comprised of primary nodes, secondary nodes and metrics that relate to the association between the primary nodes and the secondary nodes. Upon receiving the input file, the input file is abridged to reduce the number of nodes contained in the input file. The unique initial primary nodes are then clustered with their associated secondary node. The clusters containing the unique initial primary nodes are replaced if a subsequent related cluster satisfies a pre-defined condition. Clusters are then merged until the cluster size reaches a pre-defined size.

Accordingly, in one aspect, the present invention provides computer storage media having computer-executable instructions embodied thereon for performing a method for whole pass clustering of nodes. The method comprises receiving an input file wherein the input file includes a plurality of primary nodes, a plurality of secondary nodes, and a plurality of metrics, each of the plurality of metrics describing a relationship between one of the plurality of primary nodes and one of the plurality of secondary nodes, abridging the input file to generate an abridged file that is comprised of a plurality of abridged primary nodes, a plurality of abridged secondary nodes, and a plurality of abridged metrics, each of the plurality of abridged metrics describing a relationship between one of the plurality of abridged primary nodes and one of the plurality of abridged secondary nodes, wherein the plurality of abridged primary nodes includes at least one member node represented by multiple nodes of the plurality of abridged primary nodes, and wherein a number of the multiple nodes of the plurality of abridged primary nodes representing each at least one member node is at most a pre-defined maximum number; evaluating each member of the multiple nodes representing each at least one member node to determine if the member being evaluated is the first member of the multiple nodes to be evaluated wherein upon determining that the member being evaluated is the first member of the multiple nodes to be evaluated. The method further comprises merging the member being evaluated with the one of the plurality of abridged secondary nodes having a relationship with the member being evaluated to form a cluster, wherein upon determining the member being evaluated is not the first member of the multiple nodes to be evaluated. The method further comprises locating a cluster having the first member of the multiple nodes to be evaluated associated with a merged member of the plurality of abridged secondary nodes, and determining if the merged member of the plurality of abridged secondary nodes having a relationship with the first member of the multiple nodes should be replaced in the cluster with the member of the abridged secondary nodes having a relationship with the member being evaluated based on a replacement condition.

In another aspect, the present invention provides a method for whole pass clustering of keywords. The method comprises receiving an input file, the input file comprising, a plurality of originator keywords, a plurality of receptor keywords, and a plurality of tie-strength metrics, each of the plurality of tie-strength metrics representing a relationship between one of the plurality of originator keywords and one of the plurality of receptor keywords. The method is further comprised of abridging the input file to limit a number of the plurality of receptor keywords associated with each of the plurality of originator keywords to a pre-defined number to generate an abridged file, merging an initial originator keyword of the plurality of originator keywords from the abridged file with an associated receptor keyword of the plurality of receptor keywords from the abridged file to form a first cluster; evaluating a subsequent originator keyword of the plurality of originator keywords to determine if the subsequent originator keyword is an initial unique originator keyword, wherein upon determining that the subsequent originator keyword is an initial unique originator keyword. The method further comprises merging the subsequent originator keyword with an associated receptor keyword of the plurality of receptor keywords to form a first cluster, and wherein upon determining that the subsequent originator keyword is not an initial unique originator keyword. The method further comprises merging the subsequent originator keyword with an associated receptor keyword of the plurality of receptor keywords to form a second cluster, and determining, based on a condition of the associated tie-strength metric, if the first cluster should be replaced with the second cluster, wherein upon determining that the first cluster should be replaced with the second cluster. The method further comprises replacing the first cluster with the second cluster; merging the second cluster with a third cluster based on a condition of the associated tie-strength metric, wherein the second cluster and the third cluster have at least one originator keyword of the plurality of originator keywords or one receptor keyword of the plurality of receptor keywords in common; and generating a list of one or more originator keywords and one or more receptor keywords that are associated by one or more clusters.

In another aspect, the present invention provides computer storage media having computer-executable instructions embodied thereon for performing a method for whole pass clustering of keywords. The method comprises receiving an input file, the input file comprising, a plurality of originator keywords, a plurality of receptor keywords, a plurality of tie-strength metrics, each of the plurality of tie-strength metrics representing a relationship between one of the plurality of originator keywords and one of the plurality of receptor keywords, cleaning the input file to remove data from the input file; sorting the input file, wherein the input file is sorted by originator keywords and/or receptor keywords; abridging the input file to limit the number of the plurality of receptor keywords associated with each of the plurality of originator keywords to a pre-defined number to generate an abridged file, wherein the abridged file is comprised of a pre-defined number of originator keywords, a pre-defined number of receptor keywords, and a pre-defined number of tie-strength metrics. The method is further comprised of merging an initial originator keyword of the pre-defined number of originator keywords from the abridged file with an associated receptor keyword of the pre-defined number of receptor keywords from the abridged file to form a first cluster; evaluating a subsequent originator keyword of the pre-defined number of originator keywords to determine if the subsequent originator keyword is an initial unique originator keyword, wherein upon determining that the originator keyword is an initial unique originator keyword, the method further comprises merging the subsequent originator keyword with an associated receptor keyword of the pre-defined number of receptor keywords to form a first cluster, wherein upon determining that the originator keyword is not an initial unique originator keyword. The method further comprises merging the subsequent originator keyword with an associated receptor keyword of the pre-defined number of receptor keywords to form a second cluster, and evaluating the second cluster to determine, based on a condition of the associated tie-strength metric if the first cluster should be replaced, and wherein upon determining the first cluster should be replaced with the second cluster, replacing the first cluster with the second cluster; merging, based on a pre-defined cluster size limitation, the second cluster with a third cluster based on the associated tie-strength metric, wherein the second cluster and the third cluster have at least one originator keyword of the pre-defined number of originator keywords or one receptor keyword of the pre-defined number of receptor keywords in common, and generating a list of one or more originator keywords and one or more receptor keywords that are associated by one or more clusters.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
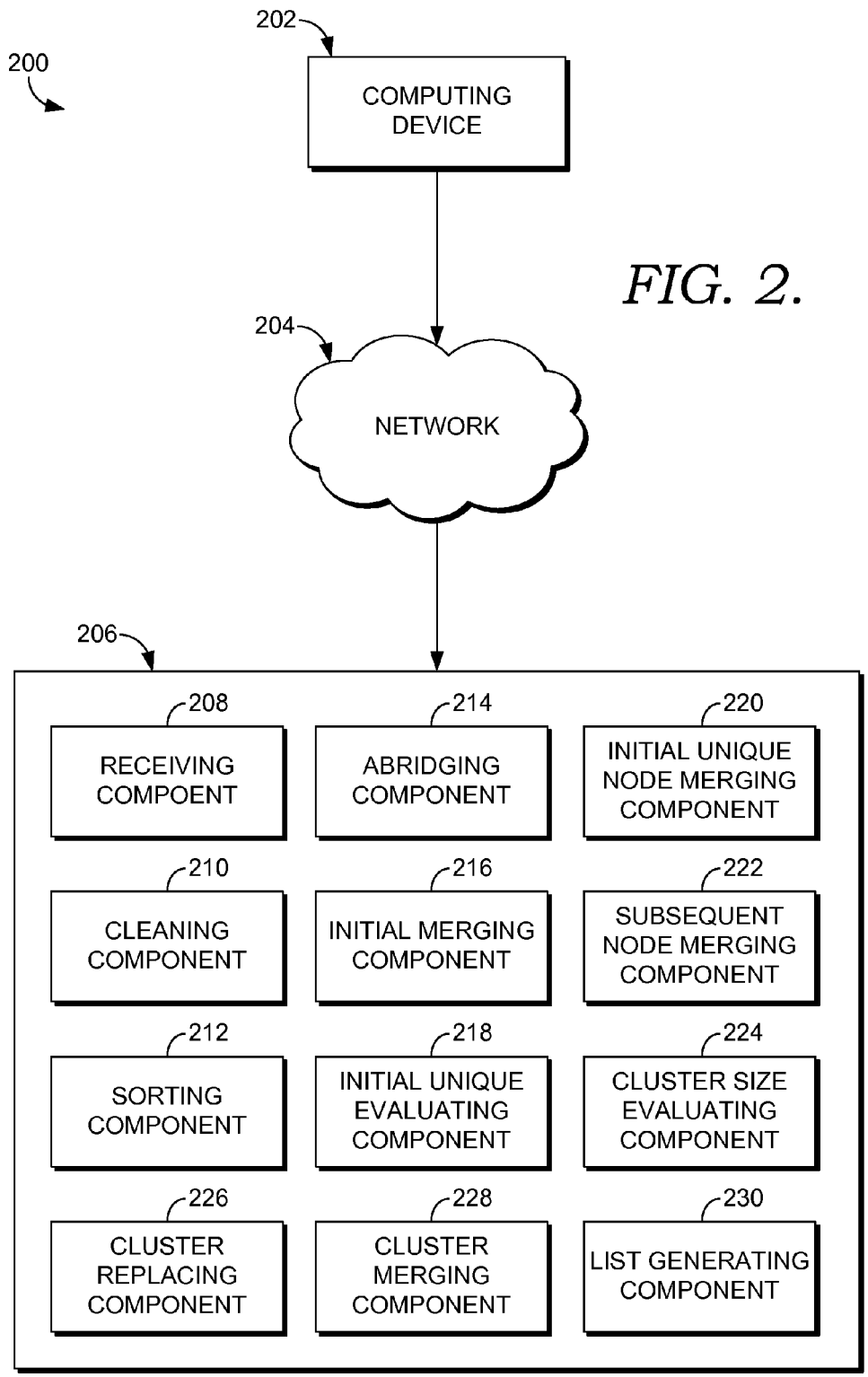
FIG. 2 is a block diagram of an exemplary clustering system, in accordance with an embodiment of the present invention.

With reference to FIG. 2, a block diagram is shown that illustrates an exemplary system suitable for implementing embodiments of the present invention as shown and designated generally as clustering system 200, in accordance with an embodiment of the present invention. Clustering system 200 is but one example of a suitable clustering system and is not intended to suggest any limitations as to the scope or functionality of the invention. Neither should clustering system 200 be interpreted as having any dependency or requirement relating to any one or combination of modules/components illustrated.

Clustering system 200 includes a computing device 202, a network, 204, a computing device 206, a receiving component 208, a cleaning component 210, a sorting component 212, an abridging component 214, an initial merging component 216, and initial unique node evaluation component 218, an initial unique node merging component 220, a subsequent node merging component 222, a cluster size evaluating component 224, a cluster replacing component 226, a cluster merging component 228, and a list generating component 230.

In an exemplary embodiment of the present invention computing devices 202 and 206 are a computing device as represented by the computing device 100 previously described in relation to FIG. 1. Computing device 202 provides an input file to computing device 206. Additionally, in an embodiment, computing device 202 is a server that contains a database that from which the input file is created. Both computing devices 202 and 204 are connected to network 204. Network 204 includes, without limitation, one or more local area networks (LANs) and/or wide area networks (WANs). Such networking environments are commonplace in offices, residential networks, intranets, and the Internet. Accordingly, the network 204 is not further described herein.

Computing device 206 contains a plurality of components. While the cluster system 200 visually depicts the components within a single computing device 206, it is understood and appreciated by those skilled in the art that the various components illustrated as part of computing device 206 can be independent from computing device 206 wherein the components are directly or indirectly connected to a network such as network 204. It will also be appreciated and understood by those skilled in the art that the components depicted as part of clustering system 200 are merely illustrations of an exemplary clustering system 200 and it has been contemplated that the components need not be separate or distinct from one another and instead the various components may be merged into multiple resulting components.

Computing device 206 includes receiving component 208. Receiving component 208 receives an input file. The input file is a file, document, data structure and/or information feed that provides nodes or nodal information that is clustered by clustering system 200. An exemplary embodiment of an input file, as visually depicted in FIG. 3A and generally indicated as input file 301 is in accordance with an embodiment of the present invention. Input file 301 includes three classes or types of information/data, primary node data, secondary node data, and metric data. A node is a data point that represents a specific instance or occurrence of data. For example, a node can represent a keyword in a marketing analysis, wherein each node represents a keyword. Further examples of nodes serving as keywords would be a first node representing the keyword "run", a second node representing the keyword "running", and a third node representing the keyword phrase "running shoes". Each of the three exemplary nodes represents a keyword or phrase. Additionally, in another exemplary embodiment, a node represents a person, identity, or group in a social network. Examples include each node represents an individual user of a social network, or a group within a social network. In yet a further embodiment, a node includes graph nodes. A graph may be formed by a plurality of graph nodes, wherein the graph nodes have connections between one another. The connection between each of the graph nodes may be either a directed connection or an undirected connection. A directed connection is when a first node is connected to a second node, but the second node is not necessarily connected to the first node. An undirected connection, on the other hand, represents a connection between a first and a second node wherein if a first node is connected to a second node, the second node is therefore connected to the first node. Examples of graphs comprised of graph nodes includes a network, which as previously discussed, a network may include a social network or advertising network. Stated in other words, nodes of a social network may represent participants within the social network and the connections represent the relationships among the participants/nodes of the social network.

The metric data of input file 301 is a value indicator of the relational strength, closeness, or correlation between a primary node and a secondary node. In an exemplary embodiment where a node represents a keyword and the metric indicates the number of advertisers that utilize or desire both the primary node and the secondary node. Therefore, using an example from above, if the primary node is "run" and an associated secondary node is "running" and the metric is "24", this indicates that twenty-four advertisers that bid on and use keyword "run" also bid on and use the keyword "running" in their online advertising campaign. In an exemplary embodiment, every secondary node is also a primary node. In an exemplary embodiment, secondary nodes are also primary nodes when the connections between the nodes are undirected. But, in an alternative exemplary embodiment, a secondary node is often, but not always, a primary node. In an exemplary embodiment of a secondary node not also being a primary node results from a directed connection among the nodes. When discussing primary nodes and secondary nodes in the context of keywords, an originator keyword is akin to a primary node while a receptor keyword is akin to a secondary node, and metric is akin to tie-strength metric.

In an exemplary embodiment, input file 301 is generated as a raw input file 310 where the order of the data and the data contained is derived from the underlying data source. Raw input file 301 includes a dataset 314 which includes a primary node entry, a secondary node entry, and a metric. The primary node entry for data set 314 is "N15", the secondary node entry for dataset 314 is "A" and the metric for dataset 314 is "1". The primary node, secondary node, and metric of dataset 314 are associated with one another because of their inclusion in a common dataset. An additional dataset of raw input file 310 is dataset 312. Dataset 312 includes a primary node of "N12", a secondary node of "E", and a metric of "13". Raw input file 310, in this exemplary embodiment, has not been sorted, cleaned, or abridged. The datasets are not in a particular order within the raw input file 310.

It will be understood and appreciated by those skilled in the art that input file 301 is a visual representation of an exemplary embodiment of an input file and that an input file may be of any form that conveys data information so that the data may be clustered by a data clustering system. As previously mentioned, the input file may be a file, document, data/information feed, or data structure that provides information that can be clustered.

Returning to FIG. 2, in an exemplary embodiment, computing device includes cleaning component 210. In an exemplary embodiment, cleaning component 210 cleans the input file. The cleaning of an input file may include removing unreliable data from the file. An example of unreliable data in a keyword setting would include those keywords that are bid on by a particular on-line advertiser that bids on a large collection of keywords. In this example, the datasets that represent those keywords used by the mass advertiser would be cleaned from the input file to provide more reliable data to the clustering system. Other examples of cleaning a keyword oriented input file would be to remove those datasets that identify a single advertiser. In this example, if there is a particular keyword that would only be used by an individual advertiser, then that data is cleaned to prevent identifying that advertiser based on the resulting clusters or input file. Cleaning of the input file may also include removing datasets that are incomplete or contain data that is inconsistent or aberrant with the other datasets of the input file.

Computing device 206 also includes sorting component 212. In an exemplary embodiment, sorting component sorts the data and/or data sets of the input file and/or variations of the input file. Sorting includes arranging the data sets by ascending, descending, numerical value, alphabetic value, or commonality of data elements of any of the data included in the input file. For example, the input file can be sorted from "A"-"Z" based on the originator keyword/primary node entry. Therefore, in the above example, the data sets associated with the primary nodes that are sorted are also manipulated in order to maintain the primary nodes in association with their associated secondary node and the metric describing the relationship between the primary and secondary nodes. Referring to FIG. 3B an exemplary embodiment of a sorted input file is illustrated and generally indicated as sorted input file 302. In an exemplary embodiment, sorted input file 302 is a sorted version of a raw input file, such as raw input file 301 illustrated in FIG. 3A. Sorted input file 302 is first sorted in an ascending manner based on the primary node and further sorted in descending order based on the metric. For example, dataset 322 includes a primary node of "N12", a secondary node of "E", and a metric of "13" which has been sorted to relocate that dataset from its original position as indicated in FIG. 3A and represented as dataset 312. Dataset 324 of FIG. 3B has been re-positioned in the sorted input file 302 from an original position as illustrated by dataset 314 of FIG. 3A.

Returning to FIG. 2, in an exemplary embodiment, computing device 206 includes abridging component 214. In an exemplary embodiment abridging component 214 abridges an input file to reduce the number of datasets included in the input file. When an input file is abridged, the resulting file may be referred to as an abridged input file. Abridging of an input file reduces the amount or number of data elements present in the input file (where input file represents any sorted, cleaned or otherwise manipulated input file). In an exemplary embodiment, an input file is abridged to reduce the number of secondary nodes that are associated with each unique primary node. For example, if there are 5 distinct secondary nodes associated with a single primary node, the input file is abridged to reduce the number of secondary nodes associated with the primary nodes. This is exemplified in FIG. 3C, an exemplary embodiment of an abridged input file generally indicated as abridged file 303. Abridged file 303, in this exemplary embodiment, has been abridged to include, at most, three secondary nodes with each primary node. For example, primary nodes "N1$x$", where "$x$" represent a number for clarification purposes only, has been reduced from having five secondary nodes associated to only having three secondary nodes associated with the primary node "N1$x$". Abridged file 303 does not contain the datasets that include primary nodes "N14" or "N15" as previously included in the input file prior to the file being abridged. Dataset 332, which is representative of dataset 322 and dataset 312 of FIG. 3A, and FIG. 3A respectively remains in the abridged file because it is one of three datasets that contained a common primary node, and had a metric that satisfied a condition. And for this example, the metric condition was the three highest metric values were maintained while all data sets with a metric score below the third highest were eliminated from the abridged file. Abridging a file reduces the file size which in turn reduces the resources required to cluster. In an exemplary embodiment, the input file is abridged so that no more than ten secondary nodes are associated with each primary node. In another exemplary embodiment, the input file is abridged so that no more than 5 secondary nodes are associated with a primary node.

Returning to FIG. 2, computing device 206 includes initial merging component 216. In an exemplary embodiment, initial merging component 216 merges each unique primary node with a secondary node based on a condition. The condition to determine which secondary nodes are paired with a primary node, in an exemplary embodiment, would be determined based on those secondary nodes that are associated with the greatest metric value. For example, if the primary node identified as "Node A" was included in three datasets, where the first dataset included the secondary node "Node B" and a metric of "1", and the second dataset included a secondary node "Node C" and a metric of "9", and a third dataset included a secondary node "Node D" and a metric of "5", "Node A" would merge with "Node C" because the data set with a primary node "Node A", a secondary node "Node C", and a metric "9" is the dataset with the highest metric that has a primary node of "Node A".

The initial merging of nodes from an abridged input file, in an exemplary embodiment, are processed in a whole pass. A whole pass processes an input file sequentially without focusing on a particular primary node, secondary node, or metric value. Instead, whole pass merging provides an efficient way of merging nodes in a document since each dataset is only evaluated once. An alternative approach to the initial merge is to process all datasets that include a particular element before moving onto the next set of datasets that contain a different particular element. An example of this type of initial merging would include evaluating only those datasets that include a particular primary node to determine which nodes should initially be merged before evaluating a different primary node value.

In an exemplary embodiment, computing device 260 includes an initial unique node evaluating component 218. The initial unique node evaluating component 218, in an embodiment of the invention, evaluates data elements to determine if the evaluated data element is the first instance of that data element to be evaluated from the input file. For example, initial unique node evaluating component 218 evaluates the primary node of each dataset to determine if that primary node value or entry has occurred previously in the input file. This allows for the first occurrence of a node entry to be determined, and once it is determined that a particular node entry is the first occurrence a resulting action may be performed. For example, if each initial unique originator keyword is expected to be merged with the associated receptor keyword, it must be determined if the current originator keyword is the first occurrence of that originator keyword, which therefore means that that originator keyword has not yet been merged, or if the originator keyword is not an initial instance and therefore a different action should be taken because that originator keyword has already been merged.

In an exemplary embodiment, computing device 206 includes initial unique node merging component 220. In an exemplary embodiment of the present invention, initial unique node merging component 220 merges a node that is an initial occurrence of a unique primary node and merges that node with an associated secondary node to form a first cluster. For example, an initial occurrence of a unique primary node is determined by initial unique node evaluating component 218, once a node has been determined as an initial occurrence of a unique node the initial unique node merging component 220 merges that identified node with the secondary node of the dataset containing the first occurrence of the initial unique primary node.

In an exemplary embodiment, computing device 206 includes subsequent node merging component 222. Subsequent node merging component 222 merges nodes wherein the primary node has not been identified as an initial unique node. For example, if the initial unique evaluating component determines that a particular node is not an initial instance, the subsequent node merging component 222 merges the nodes of that dataset to form a cluster that is not an initial or first cluster created by initial unique node merging component 220.

In yet another exemplary embodiment of the present invention, computing device 206 includes a cluster size evaluating component 224. The cluster size evaluating component 224 evaluates the size of a cluster to determine if that particular cluster satisfies a condition. For example, if three-hundred nodes have been clustered to form a cluster, the cluster size evaluating component 224 evaluate the number of nodes that are comprised in the cluster to determine if that cluster satisfies a condition that limits the number of nodes to a cluster.

In an exemplary embodiment of the present invention, computing device 206 includes a cluster replacing component 226. Cluster replacing component 226 replaces one cluster with another cluster. For example, cluster replacing component 226 replaces a first/previous cluster with a second/subsequent cluster if it is determined that the second/subsequent cluster satisfies a condition. Further in example, the condition to be satisfied in order for the cluster replacing component 226 to replace the initial/previous cluster is if the second/subsequent cluster has a higher metric than the first/subsequent cluster. Additional conditions include metric values less than a second/subsequent cluster, metric values more than a second/subsequent cluster, or other comparative conditions to determine if as cluster should be replaced.

Figure 4A:
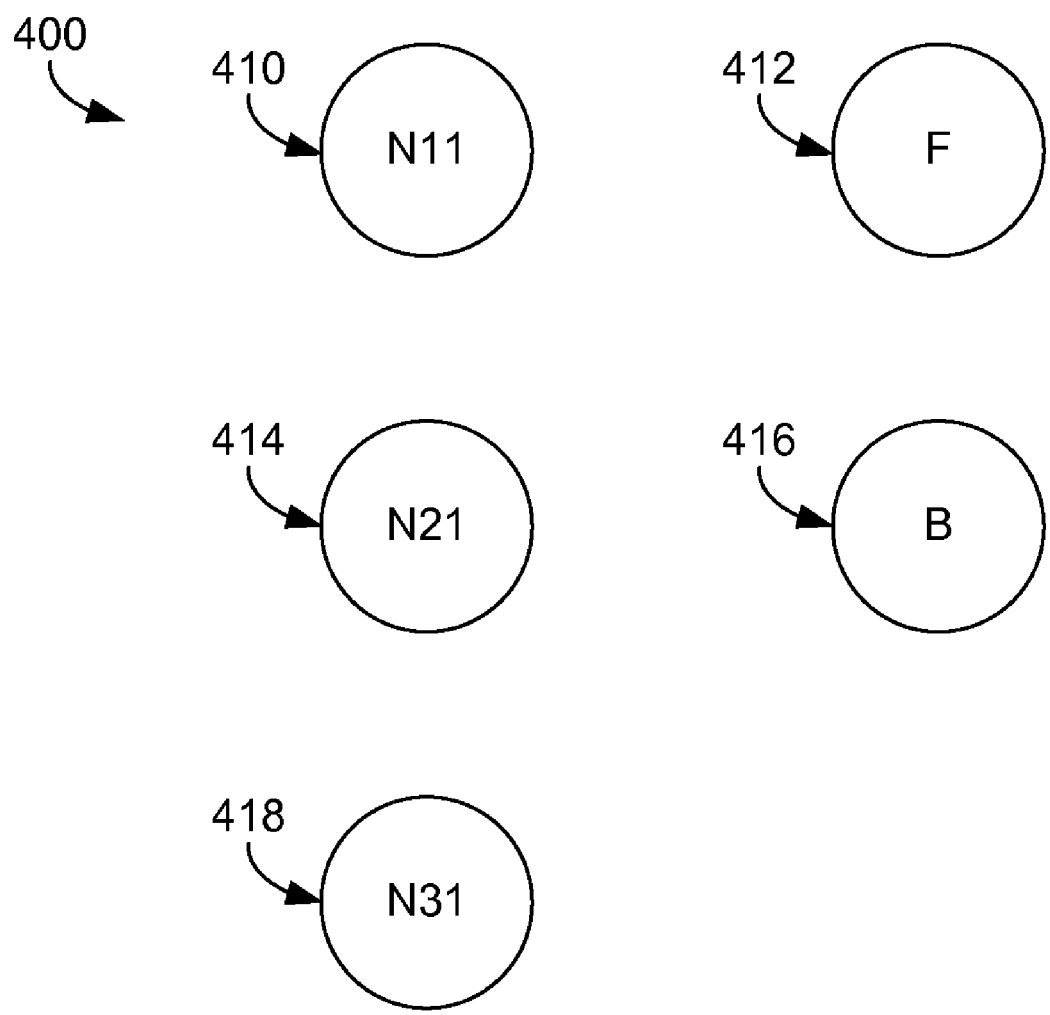
FIG. 4A is a block diagram of an exemplary set of nodes, in accordance with an embodiment of the present invention.
Figure 4B:
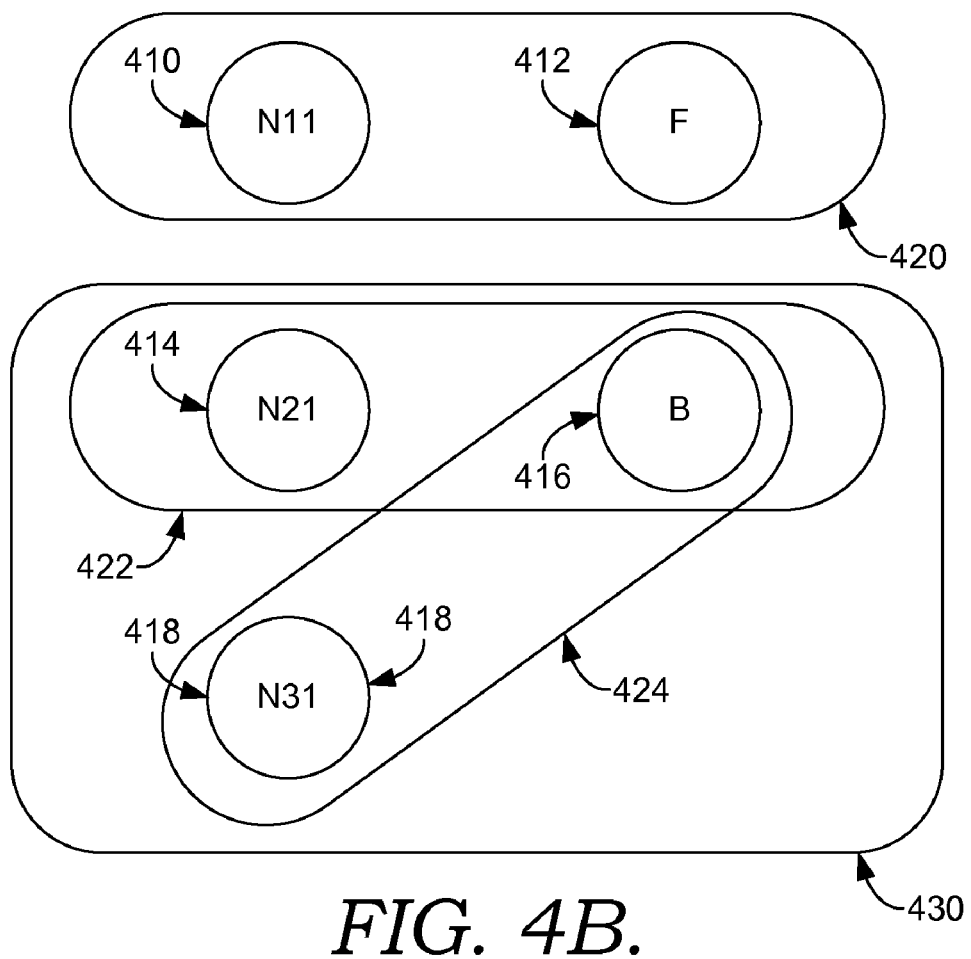
FIG. 4B is a block diagram of an exemplary set of nodes, in accordance with an embodiment of the present invention.

In an exemplary embodiment, computing device 206 includes cluster merging component 228. Cluster merging component 228 clusters two or more clusters together to form a single cluster. For example, referring to FIG. 4A, a visual representation of nodes of an embodiment of the present invention. The un-clustered group of nodes is generally referred to as nodes 400. Nodes 400 includes node 410 with represents primary node "N11", node 412 which represent secondary node "F", node 414 which represents primary node "N21", node 416 which represents secondary node "B", and node 418 which represents primary node "N31". In an exemplary embodiment of the present invention, the initial unique merging component 220 merges node 410 and node 412 to form an initial cluster since node 410 is an initial unique node as determined by the initial unique node evaluating component 218. The same is true for nodes 414 and 416 which are clustered as an initial cluster, as well as nodes 418 and 416 are clustered as an initial node. Referring to FIG. 4B, a visual representation of clusters of an embodiment of the present invention. The resulting cluster of nodes 410 and 412 is cluster 420. The resulting cluster of nodes 414 and 416 is cluster 422, and the resulting cluster of nodes 418 and 416 is cluster 424. Additionally, cluster merging component 230 clusters cluster 422 and 424 into a cluster 430. Cluster 430 includes nodes 414, 416, and 418.

In an exemplary embodiment, computing device 206 includes list generating component 230. The list generating component 230 generates a list that includes the resulting clusters and the associated nodes of the clusters. The list generated may be in the form of a data file, a document, a data/information feed or other forms that communicate the resulting clusters and node combinations. In an exemplary embodiment, the list includes each primary nodes and the secondary nodes and primary nodes that are associated by one or more common clusters. The list generated in the exemplary embodiment includes the metric(s) associated with the cluster (s) and nodes.

Figure 5:
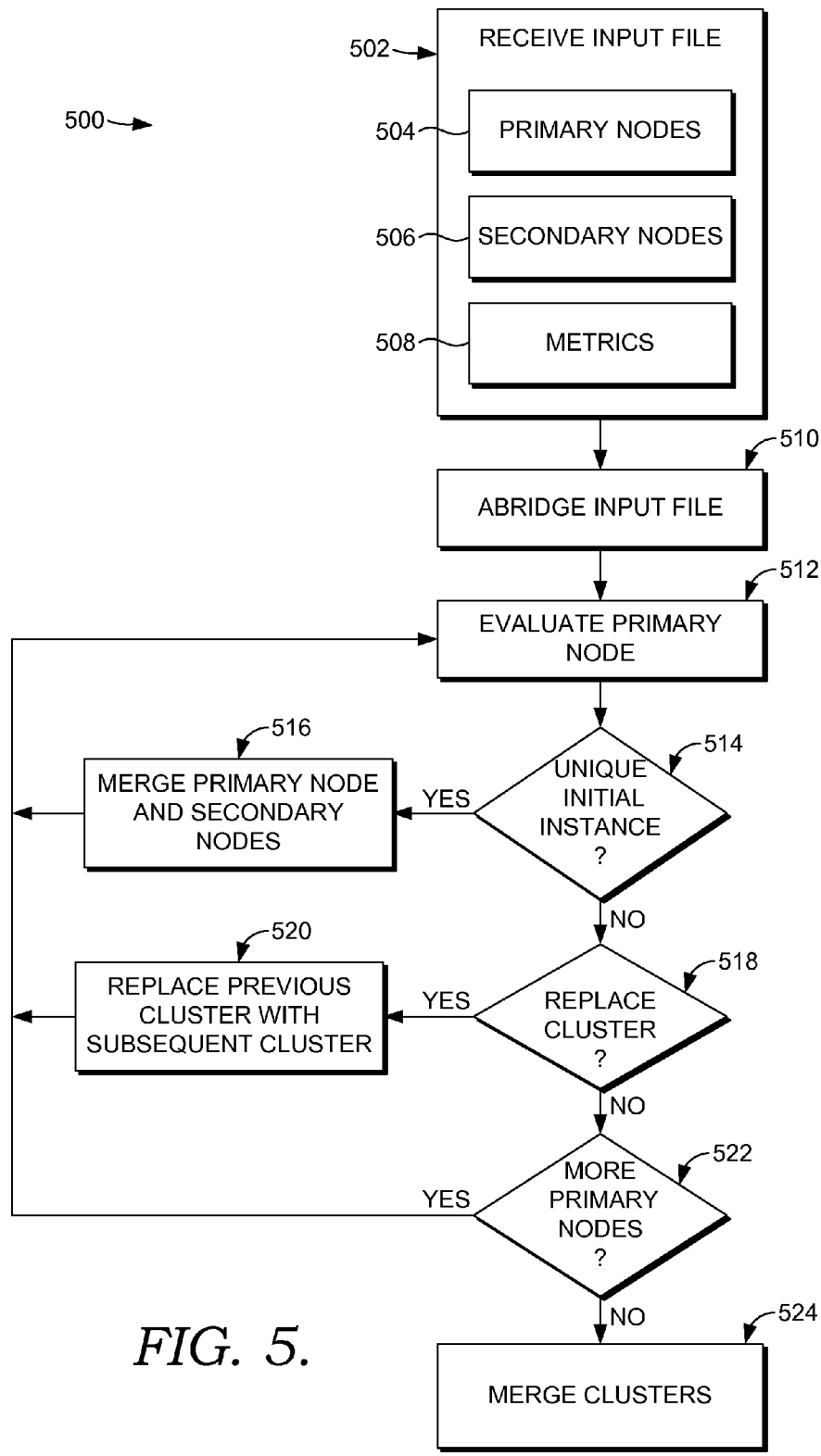
FIG. 5 is a flow diagram of an exemplary method for clustering nodes, in accordance with an embodiment of the present invention.

With reference to FIG. 5, a flow diagram is shown that illustrates an exemplary method for clustering nodes and designated generally as clustering method 500, in accordance with an embodiment of the present invention. An input file is received at block 502. The input file includes primary nodes as indicated at block 504, secondary nodes as indicated at 506, and metrics as indicated at 508. The input file is abridged to produce an abridged input file as indicated at block 510. The primary nodes of the abridged file are evaluated at block 512. The evaluation of the primary node is to determine if the primary node is a unique initial instance of that evaluated primary node as indicated at block 514. If the primary node is determined to be a unique first instance, that primary node is merged with the secondary node of the unique initial primary node's dataset as indicated at block 516.

However, if the primary node is determined not to be a unique initial instance of the primary node, then a determination is made to determine if the subsequent cluster that would result from the merging of the evaluated primary node and its associated secondary node should replace the previous cluster as indicated at block 518. Where the previous cluster is comprised of either the unique initial primary node and its associated secondary node or it is comprised of a subsequent (non-initial) primary node and its associated secondary node which had previously replaced a cluster to become the previous cluster. The determination to replace a previous or initial cluster is made by a condition. In an exemplary embodiment a previous cluster is replaced with a subsequent cluster when the metric associated with the subsequent cluster is greater than the previous cluster. When it is determined that a previous cluster should be replaced by a subsequent cluster, the previous cluster is replaced by the subsequent cluster and the subsequent cluster is then known as the previous cluster as indicated at block 520. Therefore, in an exemplary embodiment, the previous cluster will always result in having the highest associated metric following block 520.

The process of evaluating the primary node at block 512 is repeated until there are no more primary nodes to evaluate as indicated at block 522. If there are no additional primary nodes to evaluate then the previous clusters are merged with subsequent clusters as indicated at block 524. The clustering of previous clusters and subsequent clusters, in an exemplary embodiment, is done according to structured conditions or rules. For example, clusters that include common nodes are combined based on each clusters' metric value or the resulting metric value of the resulting cluster.

Figure 6:
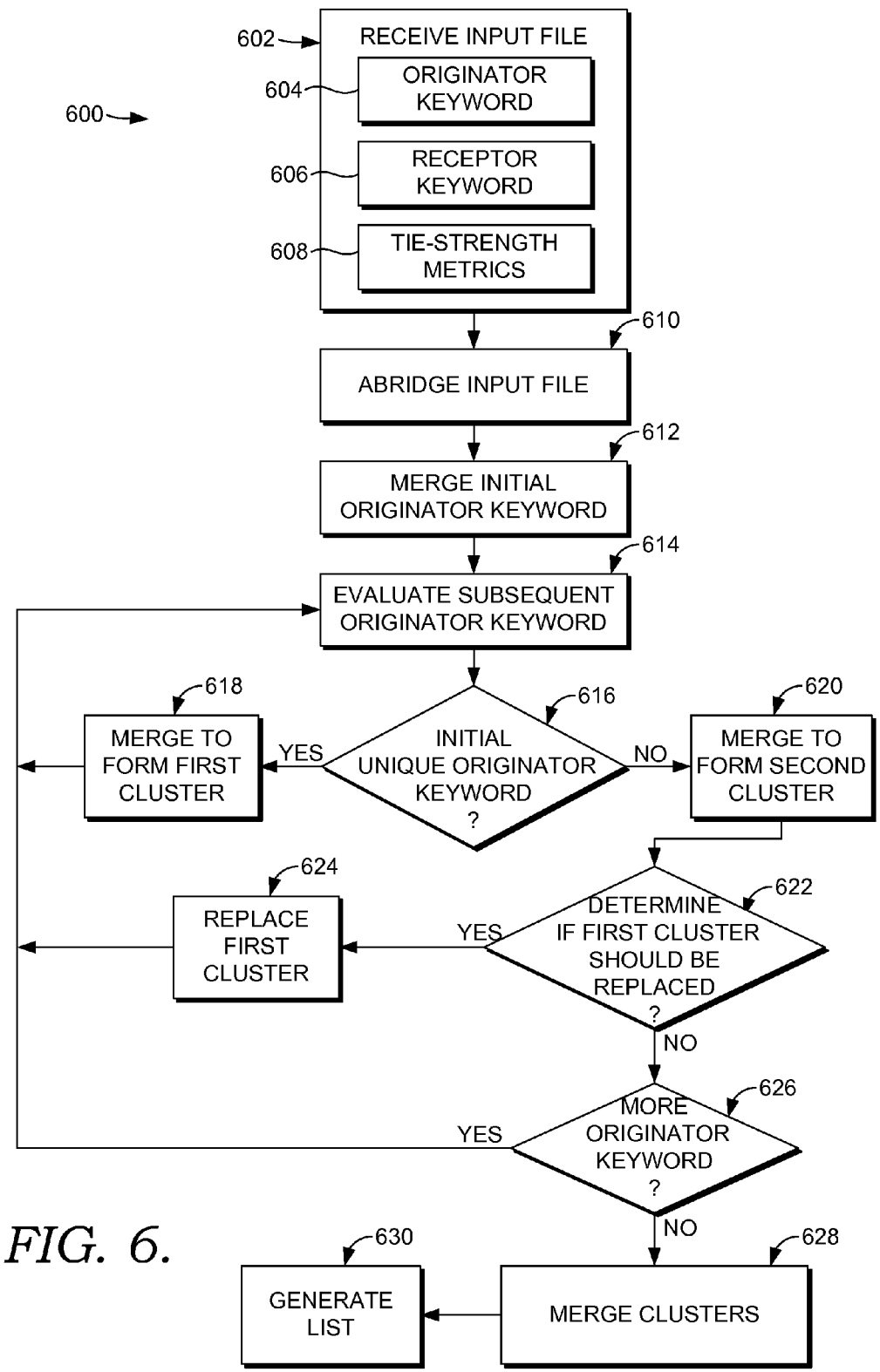
FIG. 6 is a flow diagram of an exemplary method for clustering nodes, in accordance with an embodiment of the present invention.

Referring to FIG. 6, a flow diagram is shown that illustrates an exemplary method for clustering keywords and designated generally as clustering method 600, in accordance with an embodiment of the present invention. An input file is received at block 602. The input file is comprised of originator keywords indicated at block 604, receptor keywords indicated at block 606, and tie-strength metrics indicated at block 608. The input file is abridged at block 610. The initial originator keyword of the abridged file is merged with its associated receptor keyword to form a first cluster indicated at block 612. This first cluster serves as a seed for the clustering method. Additionally, an associated receptor keyword is a receptor keyword that is included in the same dataset as the evaluated originator keyword. More generically, an associated node is a node that is contained in a common dataset.

A subsequent originator keyword is evaluated, indicated at block 614 to determine if the subsequent originator keyword is an initial unique originator keyword. If it is determined, at block 616, that the subsequent originator keyword is an initial unique keyword, meaning that that particular originator keyword has not previously been evaluated, then that originator keyword is merged with its associated receptor keyword to create a first cluster, as indicated at block 618. However, if it is determined at block 616 that the subsequent originator keyword id not an initial unique keyword, then the subsequent originator keyword is merged with its associated receptor keyword to form a second cluster as indicated at block 620.

A determination is made if the resulting second cluster should replace an existing first cluster that shares the same originator keyword, as indicated at block 622. If it is determined that the second cluster should replace the first cluster, then the second cluster does replace the first cluster as indicated at block 624. A second cluster that replaces a first cluster is then a first cluster for purposes of a subsequent determination such as done at block 622. The determination of whether a first cluster should be replaced by a second cluster is done based on stabled or pre-defined conditions and/or rules. In an exemplary embodiment, a second cluster replaces a first cluster when the second cluster has a greater associated tie-strength metric However, if it is determined that the second cluster should not replace the first cluster a determination is made to determine if additional originator keywords remain in the abridged file to evaluate, as indicated at block 626. When it is determined that additional originator keywords remain in the input file to evaluate, a subsequent originator keyword is then evaluated as indicated at block 614. If it is determined that there are no additional originator keywords to evaluate, clusters are merged as indicated at block 628. The merging of clusters, in an exemplary embodiment, is performed to combine clusters that have a common originator keyword, a common receptor keyword, or any combination of common originator keywords and receptor keywords. The merging of clusters, as indicated at block 628, merges clusters that were previously merged and continues to merge those clusters until all clusters have merged that satisfy a condition, such as a maximum node/keyword number. Finally, a list is generated as indicated at block 630. As previously discussed, the list may be in any form that communicates the relationship or association of the originator keywords, receptor keywords, tie-strength metrics, and resulting clusters.

Figure 7:
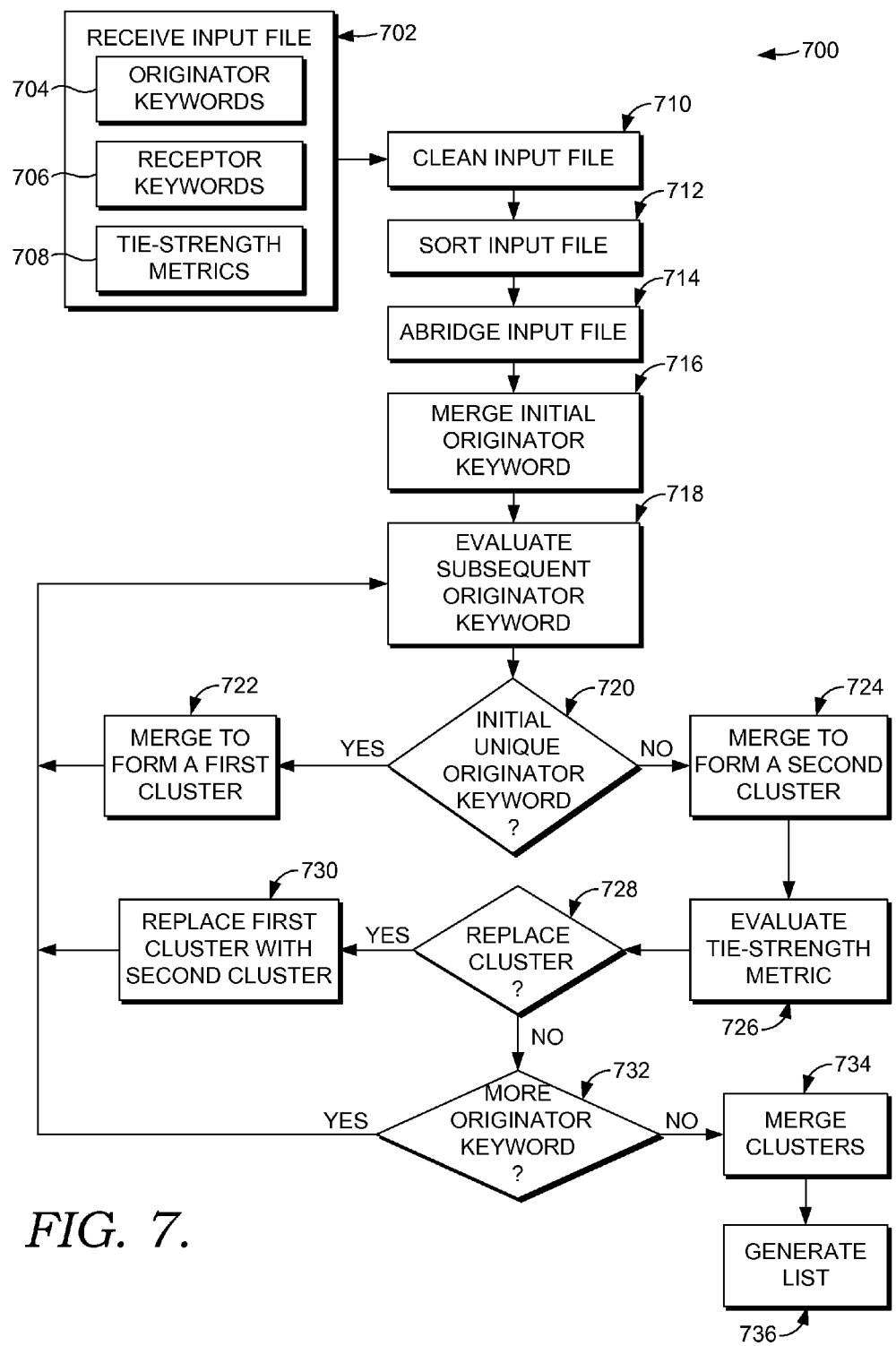
FIG. 7 is a flow diagram of an exemplary method for clustering nodes, in accordance with an embodiment of the present invention.

Referring to FIG. 7 a flow diagram is shown that illustrates an exemplary method for clustering keywords and designated generally as clustering method 700, in accordance with an embodiment of the present invention. An input file is received, as indicated at block 702. The input file is comprised of originator keywords, as indicated at block 704, receptor keywords, as indicated at block 706, and tie-strength metrics, as indicated at block 708. The input file is cleaned, as indicated at block 710, and sorted as indicated at block 712. The input file is then abridged to create an abridged file, as indicated at block 714. It is understood and appreciated by those skilled in the art that while the exemplary clustering method 700 visually represents the cleaning, sorting and abridging of the input file in a particular order, the various alternative arrangements have been contemplated and are optional embodiments of the present invention.

The initial originator keyword is merged with its associated receptor keyword to form a first cluster as indicated at block 716. A subsequent originator keyword is evaluated as indicated at block 718. The subsequent originator keyword is evaluated to determine if the subsequent originator keyword is an initial unique originator keyword as indicated at block 720. If it is determined that the subsequent originator keyword is an initial unique originator keyword, the subsequent originator keyword is merged with its associated receptor keyword to form a first cluster as indicated at block 722. However, if it is determined to the contrary, the subsequent originator keyword is merged with its associated receptor keyword to form a second cluster, as indicated at block 724.

The tie-strength of the second cluster and a related first cluster are evaluated, as indicated at block 726, to determine if the first cluster should be replaced, as indicated at block 728. If it is determined that the first cluster should replace the second cluster, the first cluster is replaced by the second cluster, as indicated at block 730. However, if it is determined that the first cluster should not be replaced a determination is made if additional originator keywords could be evaluated, as indicated at block 732. If additional, originator keywords are present in the input file, and then those keywords are evaluated in turn as indicated at block 718. If additional originator keywords do not exist, the clusters are merged to form larger clusters. The merger of clusters with other clusters, in an exemplary embodiment, is dependent on a condition that a cluster containing more than 300 originator keywords will not be merged with another cluster. Once all of the clusters have been merged to satisfy the conditions of merging, a list is generated, as indicated at block 736.

What is claimed is:

1. A method in a computing environment utilizing a processor and memory for whole pass clustering of keywords, the method comprising:
   receiving an input file, the input file comprising,
      a plurality of originator keywords,
      a plurality of receptor keywords, and
      a plurality of tie-strength metrics, each of the plurality of tie-strength metrics representing a relationship between one of the plurality of originator keywords and one of the plurality of receptor keywords;
   abridging the input file to limit a number of the plurality of receptor keywords associated with each of the plurality of originator keywords to a pre-defined number to generate an abridged file;
   merging, with the processor and memory, an initial originator keyword of the plurality of originator keywords from the abridged file with an associated receptor keyword of the plurality of receptor keywords from the abridged file to form a first cluster;
   evaluating a subsequent originator keyword of the plurality of originator keywords to determine if the subsequent originator keyword is an initial unique originator keyword,
   a) wherein upon determining that the subsequent originator keyword is an initial unique originator keyword, the method further comprises merging the subsequent originator keyword with an associated receptor keyword of the plurality of receptor keywords to form a first cluster,
   b) and wherein upon determining that the subsequent originator keyword is not an initial unique originator keyword, the method further comprises merging the subsequent originator keyword with an associated receptor keyword of the plurality of receptor keywords to form a second cluster, and
   determining, based on a condition of the associated tie-strength metric, if the first cluster should be replaced with the second cluster, wherein upon determining that the first cluster should be replaced with the second cluster, the method further comprises replacing the first cluster with the second cluster;
   merging the second cluster with a third cluster based on a condition of the associated tie-strength metric, wherein the second cluster and the third cluster have at least one originator keyword of the plurality of originator keywords or one receptor keyword of the plurality of receptor keywords in common; and
   generating a list of one or more originator keywords and one or more receptor keywords that are associated by one or more clusters.

2. The method of claim 1, wherein the method further comprises removing unreliable data from the input file.

3. The method of claim 1, wherein the method further comprises sorting the input file by the plurality tie-strength metrics.

4. The method of claim 1, wherein the number of receptor keywords of the plurality of receptor keywords that are associated with each unique originator keyword of the plurality of originator keywords is limited to ten or less in the abridged file.

5. The method of claim 1, wherein the number of receptor keywords of the plurality of receptor keywords that are associated with each unique originator keyword of the plurality of originator keywords is limited to five or less in the abridged file.

6. The method of claim 1, wherein the tie-strength metric between an originator keyword and a receptor keyword is based on the number of keyword accounts that use both the originator keyword and the receptor keyword.

7. The method of claim 1, wherein merging the originator keyword of the plurality of originator keywords with a receptor keyword of the plurality of receptor keywords to form a first cluster comprises a one-pass combine.

8. The method of claim 1, wherein the second cluster is only merged with the third cluster if the second cluster is comprised of a defined number of originator keywords and/or receptor keywords or less.

9. The method of claim 1, wherein the second cluster is only merged with the third cluster if the second cluster is comprised of three-hundred originator keywords and/or receptor keywords or less.

10. One or more computer storage media having computer-executable instructions embodied thereon that, when executed, perform a method for whole pass clustering of keywords, the method comprising:
    receiving an input file, the input file comprising,
       a plurality of originator keywords,
       a plurality of receptor keywords,
       a plurality of tie-strength metrics, each of the plurality of tie-strength metrics representing a relationship between one of the plurality of originator keywords and one of the plurality of receptor keywords;
    cleaning the input file to remove data from the input file;
    sorting the input file, wherein the input file is sorted by originator keywords and/or receptor keywords;
    abridging the input file to limit the number of the plurality of receptor keywords associated with each of the plurality of originator keywords to a pre-defined number to generate an abridged file, wherein the abridged file is comprised of a pre-defined number of originator keywords, a pre-defined number of receptor keywords, and a pre-defined number of tie-strength metrics;
    merging an initial originator keyword of the pre-defined number of originator keywords from the abridged file with an associated receptor keyword of the pre-defined number of receptor keywords from the abridged file to form a first cluster;
    evaluating a subsequent originator keyword of the pre-defined number of originator keywords to determine if the subsequent originator keyword is an initial unique originator keyword,
    a) wherein upon determining that the originator keyword is an initial unique originator keyword, the method further comprises merging the subsequent originator keyword with an associated receptor keyword of the pre-defined number of receptor keywords to form a first cluster,
    b) wherein upon determining that the originator keyword is not an initial unique originator keyword, the method further comprises merging the subsequent originator keyword with an associated receptor keyword of the pre-defined number of receptor keywords to form a second cluster, and evaluating the second cluster to determine, based on a condition of the associated tie-strength metric if the first cluster should be replaced, c) and wherein upon determining the first cluster should be replaced with the second cluster, replacing the first cluster with the second cluster;

merging, based on a pre-defined cluster size limitation, the second cluster with a third cluster based on the associated tie-strength metric, wherein the second cluster and the third cluster have at least one originator keyword of the pre-defined number of originator keywords or one receptor keyword of the pre-defined number of receptor keywords in common; and generating a list of one or more originator keywords and one or more receptor keywords that are associated by one or more clusters.

11. One or more computer storage media having computer-executable instructions embodied thereon that, when executed, perform a method for whole pass clustering of keywords, the method comprising:

receiving an input file, the input file comprising,
a plurality of originator keywords,
a plurality of receptor keywords, and
a plurality of tie-strength metrics, each of the plurality of tie-strength metrics representing a relationship between one of the plurality of originator keywords and one of the plurality of receptor keywords;

abridging the input file to limit a number of the plurality of receptor keywords associated with each of the plurality of originator keywords to a pre-defined number to generate an abridged file;

merging, with the processor and memory, an initial originator keyword of the plurality of originator keywords from the abridged file with an associated receptor keyword of the plurality of receptor keywords from the abridged file to form a first cluster;

evaluating a subsequent originator keyword of the plurality of originator keywords to determine if the subsequent originator keyword is an initial unique originator keyword, a) wherein upon determining that the subsequent originator keyword is an initial unique originator keyword, the method further comprises merging the subsequent originator keyword with an associated receptor keyword of the plurality of receptor keywords to form a first cluster, b) and wherein upon determining that the subsequent originator keyword is not an initial unique originator keyword, the method further comprises merging the subsequent originator keyword with an associated receptor keyword of the plurality of receptor keywords to form a second cluster, and determining, based on a condition of the associated tie-strength metric, if the first cluster should be replaced with the second cluster, wherein upon determining that the first cluster should be replaced with the second cluster, the method further comprises replacing the first cluster with the second cluster;

merging the second cluster with a third cluster based on a condition of the associated tie-strength metric, wherein the second cluster and the third cluster have at least one originator keyword of the plurality of originator keywords or one receptor keyword of the plurality of receptor keywords in common; and generating a list of one or more originator keywords and one or more receptor keywords that are associated by one or more clusters.

12. The computer storage media of claim 11, wherein the method further comprises removing unreliable data from the input file.

13. The computer storage media of claim 11, wherein the method further comprises sorting the input file by the plurality tie-strength metrics.

14. The computer storage media of claim 11, wherein the number of receptor keywords of the plurality of receptor keywords that are associated with each unique originator keyword of the plurality of originator keywords is limited to ten or less in the abridged file.

15. The computer storage media of claim 11, wherein the number of receptor keywords of the plurality of receptor keywords that are associated with each unique originator keyword of the plurality of originator keywords is limited to five or less in the abridged file.

16. The computer storage media of claim 11, wherein the tie-strength metric between an originator keyword and a receptor keyword is based on the number of keyword accounts that use both the originator keyword and the receptor keyword.

17. The computer storage media of claim 11, wherein merging the originator keyword of the plurality of originator keywords with a receptor keyword of the plurality of receptor keywords to form a first cluster comprises a one-pass combine.

18. The computer storage media of claim 11, wherein the second cluster is only merged with the third cluster if the second cluster is comprised of a defined number of originator keywords and/or receptor keywords or less.

19. The computer storage media of claim 11, wherein the second cluster is only merged with the third cluster if the second cluster is comprised of three-hundred originator keywords and/or receptor keywords or less.

* * * * *